United States Patent
Bhattacharya et al.

(10) Patent No.: US 7,636,937 B1
(45) Date of Patent: Dec. 22, 2009

(54) METHOD AND APPARATUS FOR COMPARING ACCESS CONTROL LISTS FOR CONFIGURING A SECURITY POLICY ON A NETWORK

(75) Inventors: Partha Bhattacharya, Cupertino, CA (US); Shigang Chen, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 694 days.

(21) Appl. No.: 10/044,019

(22) Filed: Jan. 11, 2002

(51) Int. Cl.
G06F 7/04 (2006.01)
G06F 17/00 (2006.01)
H04L 9/32 (2006.01)
G06F 15/173 (2006.01)

(52) U.S. Cl. .................. 726/2; 726/1; 726/5; 726/6; 726/14; 713/168; 713/170; 709/223; 709/225

(58) Field of Classification Search ......... 709/220–225; 713/200–208
See application file for complete search history.

(56) References Cited

U.S. PATENT DOCUMENTS

| | | | |
|---|---|---|---|
| 5,220,604 A * | 6/1993 | Gasser et al. ................. 707/9 |
| 5,677,851 A * | 10/1997 | Kingdon et al. ............. 709/229 |
| 5,701,458 A * | 12/1997 | Bsaibes et al. ................. 707/9 |
| 5,761,669 A * | 6/1998 | Montague et al. ....... 707/103 R |
| 5,822,434 A * | 10/1998 | Caronni et al. .............. 713/156 |
| 5,825,772 A | 10/1998 | Dobbins et al. |
| 5,956,715 A * | 9/1999 | Glasser et al. ................. 707/9 |
| 6,115,753 A | 9/2000 | Joens |
| 6,167,444 A | 12/2000 | Boden et al. |
| 6,185,619 B1 | 2/2001 | Joffe et al. |
| 6,225,999 B1 | 5/2001 | Jain et al. |
| 6,246,689 B1 | 6/2001 | Shavitt |
| 6,286,038 B1 | 9/2001 | Reichmeyer |
| 6,289,013 B1 * | 9/2001 | Lakshman et al. .......... 370/389 |
| 6,298,044 B1 | 10/2001 | Britt |
| 6,301,613 B1 * | 10/2001 | Ahlstrom et al. ............ 709/223 |
| 6,412,000 B1 | 6/2002 | Riddle et al. |
| 6,484,261 B1 | 11/2002 | Wiegel |
| 6,502,131 B1 | 12/2002 | Vaid et al. |
| 6,611,863 B1 * | 8/2003 | Banginwar .................. 709/220 |
| 6,633,915 B1 | 10/2003 | Hashimoto |
| 6,646,989 B1 | 11/2003 | Khotimsky et al. |
| 6,651,096 B1 * | 11/2003 | Gai et al. .................... 709/223 |
| 6,697,338 B1 | 2/2004 | Breitbart et al. |
| 6,760,775 B1 | 7/2004 | Anerousis et al. |

(Continued)

OTHER PUBLICATIONS

Cisco Systems, "Cisco Secure Policy Manager2.3," Cisco Systems Data Sheet, Copyright 1992-2001, pp. 1-6. .

(Continued)

Primary Examiner—Christopher A Revak
Assistant Examiner—Aravind K Moorthy
(74) Attorney, Agent, or Firm—Hickman Palermo Truong & Becker LLP

(57) ABSTRACT

Two or more access control lists that are syntactically or structurally different may be compared for functional or semantic equivalence in order to configure a security policy on a network. A first access control list is programmatically determined to be functionally equivalent to a second access control list for purpose of configuring or validating security policies on a network. In one embodiment, a box data representation facilitates comparing entries and sub-entries of the lists.

16 Claims, 6 Drawing Sheets

U.S. PATENT DOCUMENTS

| | | | |
|---|---|---|---|
| 6,857,018 B2 * | 2/2005 | Jiang | 709/225 |
| 6,871,284 B2 | 3/2005 | Cooper et al. | |
| 6,880,005 B1 * | 4/2005 | Bell et al. | 709/225 |
| 6,909,709 B2 | 6/2005 | Mesiwala | |
| 6,910,041 B2 * | 6/2005 | Exton et al. | 707/9 |
| 7,020,718 B2 * | 3/2006 | Brawn et al. | 709/238 |
| 7,028,098 B2 * | 4/2006 | Mate et al. | 709/238 |
| 7,039,053 B1 * | 5/2006 | Freed et al. | 370/392 |
| 7,133,914 B1 * | 11/2006 | Holbrook | 709/224 |
| 7,370,351 B1 * | 5/2008 | Ramachandran et al. | 726/8 |
| 7,516,475 B1 * | 4/2009 | Chen et al. | 726/1 |
| 2002/0062359 A1 | 5/2002 | Klopp et al. | |
| 2002/0099952 A1 * | 7/2002 | Lambert et al. | 713/200 |
| 2002/0124053 A1 * | 9/2002 | Adams et al. | 709/216 |
| 2002/0162030 A1 * | 10/2002 | Brezak et al. | 713/202 |
| 2003/0070070 A1 | 4/2003 | Yeager et al. | |
| 2003/0115196 A1 * | 6/2003 | Boreham et al. | 707/4 |
| 2003/0115344 A1 * | 6/2003 | Tang et al. | 709/229 |
| 2003/0172145 A1 | 9/2003 | Nguyen | |
| 2003/0221004 A1 | 11/2003 | Stupek et al. | |
| 2004/0030796 A1 | 2/2004 | Cooper et al. | |
| 2005/0086300 A1 | 4/2005 | Yeager et al. | |
| 2005/0105524 A1 | 5/2005 | Stevens et al. | |

OTHER PUBLICATIONS

K. Lougheed, et al., "A Border Gateway Protocol (BGP)", Network Working Group Request for Comments: 1105, Jun. 1989, pp. 1-5.

K. Lougheed, et al., "A Border Gateway Protocol (BGP)", Network Working Group Request for Comments: 1163, Jun. 1990, pp. 1-28.

K. Lougheed, et al., "A Border Gateway Protocol 3 (BGP-3)", Network Working Group Request for Comments: 1267, Oct. 1991, pp. 1-33.

Y. Rekhter, et al., "Application of the Border Gateway Protocol in the Internet", Network Working Group Request for Comments: 1268, Oct. 1991, pp. 1-13.

S. Willis, et al., "Definitions of Managed Objects for the Border Gateway Protocol (Version 3)", Network Working Group Request for Comments: 1269, Oct. 1991, pp. 1-8.

Y. Rekhter, et al., "Application of the Border Gateway Protocol in the Internet", Network Working Group Request for Comments: 1655, Jul. 1994, pp. 1-12.

Y. Rekhter, et al., "Application of the Border Gateway Protocol in the Internet", Network Working Group Request for Comments: 1772, Mar. 1995, pp. 1-18.

J. Moy, "OSPF protocol analysis", Network Working Group Request for Comments: 1245, Jul. 1991, pp. 1-12.

J. Moy, "Experience with the OSPF protocol", Network Working Group Request for Comments: 1246, Jul. 1991, pp. 1-29.

J. Moy, "OSPF Version 2", Network Working Group Request for Comments: 1247, Jul. 1991, pp. 1-17.

G. Malkin, "RIP Version 2 Protocol Analysis", Network Working Group Request for Comments: 1387, Jan. 1993, pp. 1-3.

G. Malkin, "RIP Version 2 Protocol Analysis", Network Working Group Request for Comments: 1721, Nov. 1994, pp. 1-4.

\* cited by examiner

METHOD AND APPARATUS FOR COMPARING ACCESS CONTROL LISTS FOR CONFIGURING A SECURITY POLICY ON A NETWORK

FIELD OF THE INVENTION

The present invention generally relates to configuring security policies on a network. The invention relates more specifically to comparing access control lists of one or more routing devices for configuring a security policy on a network.

BACKGROUND OF THE INVENTION

Network management systems implement policies by configuring managed devices in the network, such as routers, switches, gateways, and firewalls, with instructions appropriate to carry out a desired policy. One general application for a network management system is implementation of a security policy on firewalls and other security devices. A policy server may be used in conjunction with other components to configure security devices on the network with security policies. CISCO SECURE POLICY MANAGER (CSPM), manufactured by CISCO SYSTEMS, INC., San Jose, Calif., is a commercially available software package for implementing security policies using a policy server.

An access control list (ACL) is a data structure that contains instructions for configuring firewalls and other security devices on a network. The instructions are usually provided by an administrator or operator of the network. Each firewall that is managed on a network may be configured by one or more ACLs. Each ACL typically contains multiple entries. Each entry identifies specific attributes associated with communication packets and instructions on how communication packets with such attributes are to be treated by the firewalls. The instruction provided with each entry specifies, for example, whether certain communication packets are to be permitted or denied based on source and/or destination information, protocol information, etc.

Usually, each firewall has been configured by at least one active ACL that was created and stored on a server of the network management system. ACLs are subject to revisions and updates, so the policy server may store several prior versions of an ACL. The ACL may be updated through the addition of entries, which provide new or superseding instructions for specified communication packets that may pass through the network. ACLs may contain hundreds or thousands of entries, each of which specify a particular instruction for the specified set of communication packets.

In a typical configuration, each firewall is configured by at least one ACL that is maintained on a server of the network management system. Numerous ACLs may exist for the same network.

Two ACLs are functionally equivalent when each ACL implements the same policy action on the same set of communication packets. However, two functionally equivalent ACLs may be very different in length or size, form and structure. One ACL may contain several more entries than another, but the ultimate effect of each ACL on communication packets passing through the network may be the same. The two ACLs may be equivalent because the ACL entries may supersede one another, include overlapping ranges of addresses, or combine with one another to have the same effect as one entry for a particular set of communication packets. For example, one entry from a first ACL may be equivalent to multiple entries from a second ACL, or one entry on the ACL may supersede other entries in the same ACL. As another example, a new ACL entry may supersede multiple prior entries, so that one ACL has redundant entries, while another does not.

There are several scenarios where it is desirable to determine whether two ACLs that appear to be different are equivalent in effect. For example, in one scenario, a network management system implements a security audit utility that periodically checks for validity of existing firewall configurations against an approved configuration. The approved configuration may be implemented using an approved ACL. Each firewall configuration may be checked against the approved configuration by comparing the ACL of that firewall to the approved ACL to determine whether the two ACLs are equivalent.

In another scenario, a network may be managed by a security management tool, such as CSPM, that enforces security on a number of firewall and virtual private networks. Typically, an administrator writes new policies for the network, and the tool may compute new configurations based on the new policies. The tool is required to validate any new configuration against the existing configurations of the devices. One step for validating security configurations includes comparing the ACL of an existing configuration with the ACL of a new configuration. The comparison enables the administrator of the network to detect when new configurations will change policies on the security devices. In addition, if the administrator can detect that the new configurations are equivalent to the existing configurations, the administrator will be able to avoid reconfiguring the device, thereby reducing device downtime.

In a third scenario, an administrator may wish to reduce the size, or otherwise optimize, the ACLs on the network, to improve processing efficiency and speed. For example, if there are two functionally equivalent ACLs but a first one of the ACLs has a substantially larger number of entries, that ACL will require more time to process than the shorter of the two. The administrator may identify a more optimal ACL for a particular firewall. The administrator may then compare the existing ACL to the more optimal ACL in order to validate that the optimal ACL is equivalent to the existing ACL. Such optimization may also improve readability and maintainability of the ACLs.

The process of comparing ACLs can be cumbersome and labor-intensive. As mentioned, entries in an ACL that appear to be different may be functionally equivalent with respect to how they affect communication packets passing through the network. Furthermore, entries may be ordered differently, making determination of equivalence between two ACLs even more difficult.

Current techniques for comparing ACLs generally require extensive manual input and calculation. The task of comparing two or more ACLs is typically performed by an administrator or other skilled technician. Comparing two or more ACLS can become a very tedious, and even impossible task, as the size of the ACLs increase.

Based on the foregoing, there is a clear need for a technique to automate a determination of whether two or more ACLs are equivalent. Furthermore, there is a need to automate the determination of whether two or more ACLs are equivalent, when the ACLs carry a large number of entries.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY OF THE INVENTION

The foregoing needs, and other needs and objects that will become apparent for the following description, are achieved in the present invention, which comprises, in one aspect, a method for comparing access control lists in order to configure a security policy on a network.

A method as described under an embodiment includes programmatically determining whether a first access control list is functionally or semantically equivalent to a second access control list for implementing a security policy on the network, when the second access control list is syntactically or structurally different from the first access control list.

According to one embodiment, a method is provided for comparing two or more large access control lists for equivalence. For example, each ACL may include one hundred or more entries.

In other aspects, the invention encompasses a computer apparatus, a computer readable medium, and a carrier wave configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for comparing access control lists to configure a security policy on a network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 OVERVIEW
2.0 FUNCTIONAL DESCRIPTION
   2.1 OVERVIEW FOR DETERMINING WHETHER ACLS ARE EQUIVALENT
   2.2 METHODOLOGY FOR IDENTIFYING SUB-ENTRIES OF AN ACL
   2.3 METHODOLOGY FOR DETERMINING WHETHER ACLS ARE EQUIVALENT USING SUB-ENTRIES
3.0 EXAMPLE FOR DETERMINING IF TWO ACLS ARE EQUIVALENT
4.0 IMPLEMENTATION ARCHITECTURE
5.0 HARDWARE DESCRIPTION
6.0 EXTENSIONS AND ALTERNATIVES

1.0 Overview

According to an embodiment, two ACLs may be programmatically compared for functional equivalence in order to configure a set of security policies on a network. The first and second ACLs may be compared for purposes that include configuring security devices on the network. For example, ACLs may be compared in order to validate existing configurations or implement new policies on security devices.

As used herein, the terms "equivalent" or "equivalence", as applied to ACLs, means that two or more ACLs specify instructions that functionally affect communication packets having the same defined range of dimensions in the same manner, or are semantically the same, even though the ACLs are different in textual appearance, form, length, size, or syntax.

The term "dimension" refers to a characteristic or property or attribute of a communication packet that can be used to specify or identify that communication packet for a policy action. In an embodiment, there are five dimensions: source address range, destination address range, source port range, destination port range, and communication protocol.

The term "programmatically" means through use of software elements, computer programming or processing logic. Programmatically performed steps are automatic, and may involve one or more software elements, hardware elements, or a combination thereof.

Embodiments of the invention allow for a software tool, processor, administrator or user of a network to compare two or more ACLs quickly, with no error. Comparing different ACLs in such an efficient manner facilitates functions such as configuring new security policies on a network, validating existing security configurations, and optimizing existing configurations of security policies.

2.0 Functional Description

Figure 1:
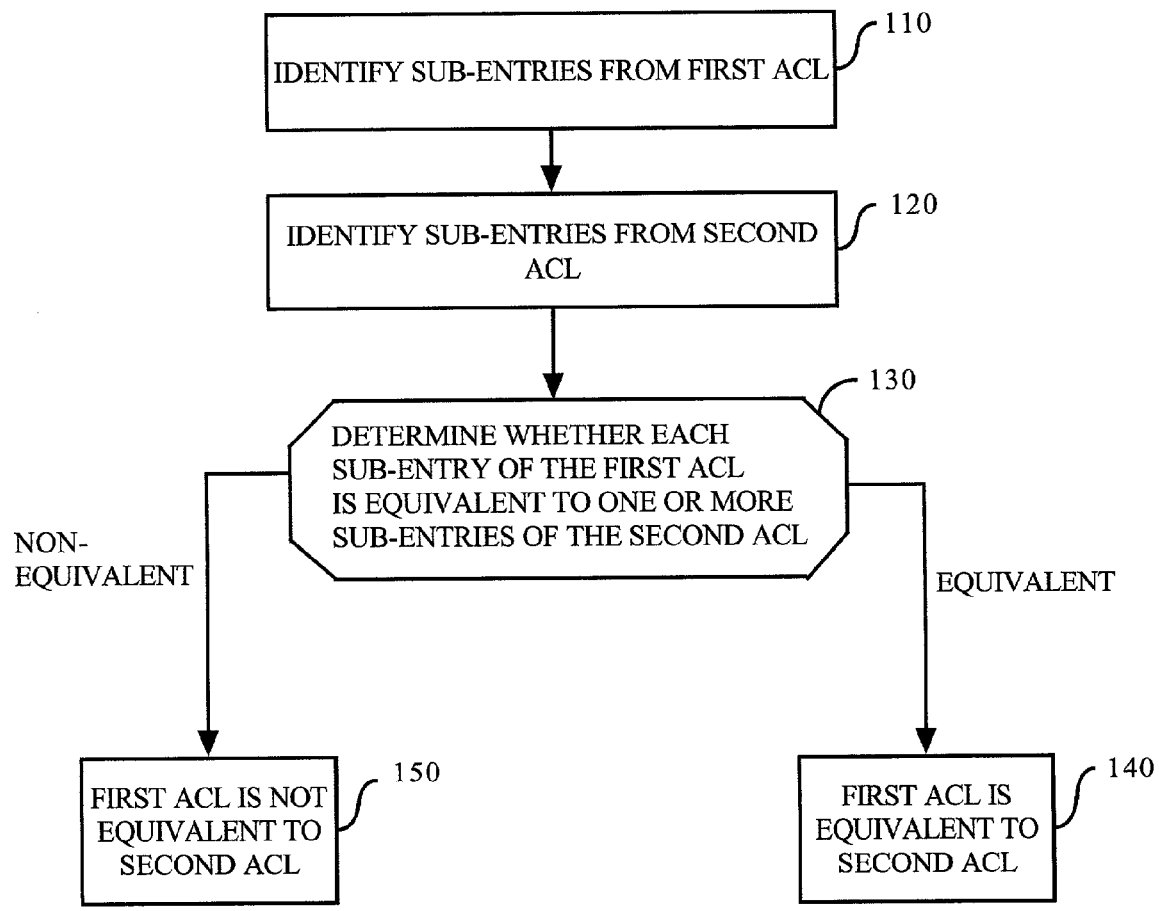
FIG. 1 is a flow diagram showing a high-level view of one embodiment of a method for determining whether a first access control list is functionally equivalent to a second access control list.
Figure 2:
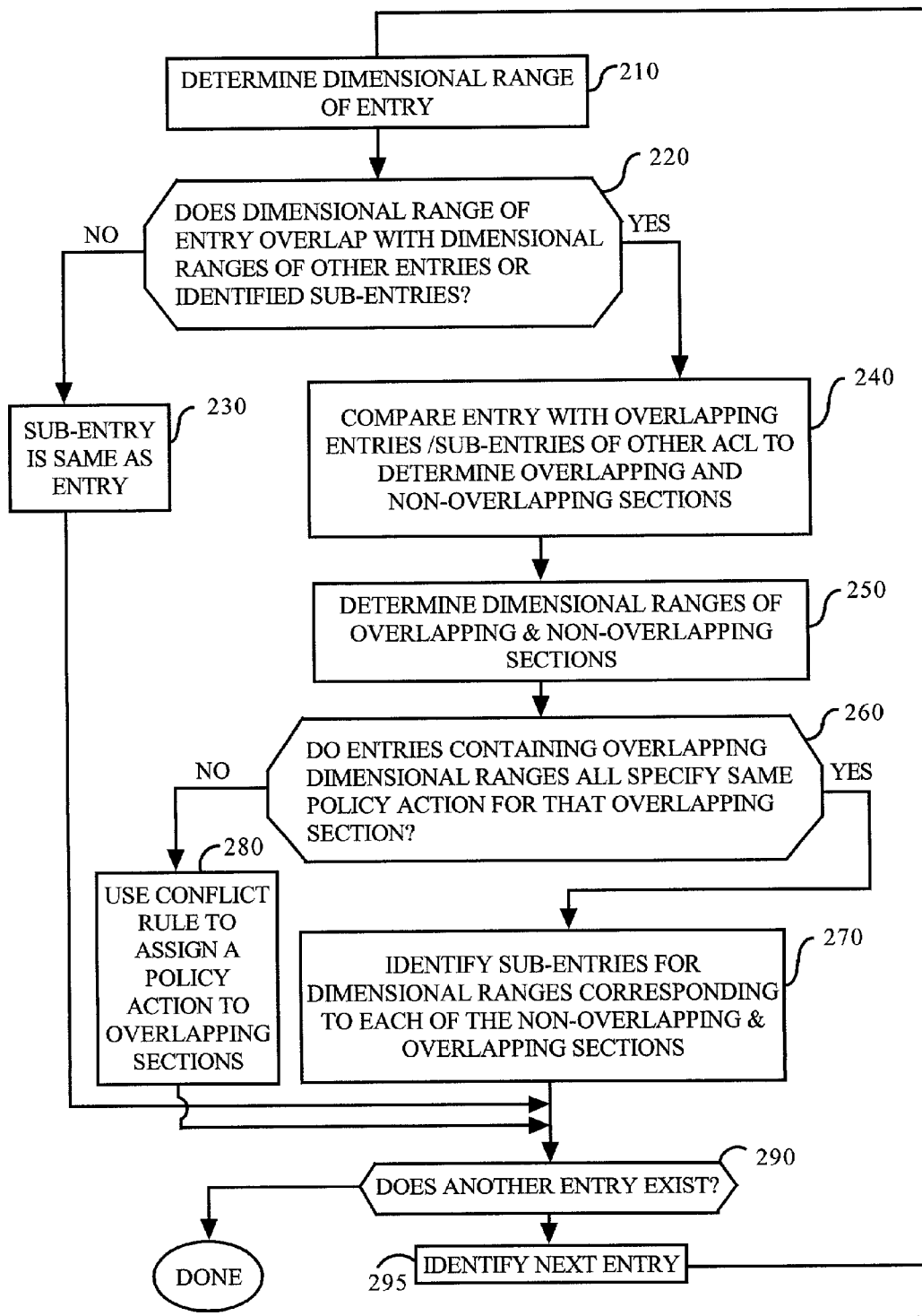
FIG. 2 is a flow diagram showing a method for determining sub-entries from entries in an access control list.

FIG. 1 is a flow diagram showing a high-level view of one embodiment of a method for determining whether a first access control list is functionally equivalent to a second access control list. FIG. 2 is a flow diagram showing a method for determining sub-entries from entries in an access control list. Thus, in general, FIG. 1 and FIG. 2 describe methods for determining whether a first ACL is equivalent to a second ACL. Each ACL is assumed to have a plurality of entries. Each entry specifies a policy action, a source address range and a destination address range. Each entry may also specify a source port range, a destination port range, and a protocol for communication packets that are to be controlled by that entry. Therefore, each entry is assumed to have five dimensions: source address range, destination address range, source port range, destination port range and protocol. ACL examples having such five dimensions are provided in Section 3.0, accompanying FIG. 4 and FIG. 5. Other embodiments may provide for more or less dimensions.

The policy actions specified by each entry, for example, designate one of "permit" or "deny" for communication packets that are to be analyzed by firewall devices. For each ACL entry, the policy action states what action is to be taken for a communication packet that falls inside the dimensional ranges specified by that entry.

2.1 Overview for Determining Whether ACLs are Equivalent

According to a method such as described in FIG. 1, each entry in an ACL may be identified as one or more sub-entries that state the same policy action as the corresponding ACL entry. Sub-entries are determined by identifying dimensional ranges of entries that are overlapping and non-overlapping with dimensional ranges of other entries. One sub-entry is defined for each dimensional range that does not overlap the dimensional ranges of other sub-entries. In the case that dimensional ranges of several entries overlap one another, only one sub-entry is defined for the overlapped area whose policy action is the same as the first overlapping entry. Therefore, whenever two entries overlap, a conflict rule may be implemented that states the policy action of the sub-entry for the overlapped area is always defined according to the first entry of the two entries if the two entries have different policy actions.

In step 110, sub-entries are identified from entries of the first ACL. In step 120, sub-entries are identified from entries of the second ACL. An example of determining sub-entries from entries of an ACL is described further herein with respect to FIG. 2, FIG. 4A and FIG. 4B.

In step 130, a determination is made as to whether each sub-entry in the first ACL is equivalent to one or more sub-entries of the second ACL. Equivalence may be found if (i) each sub-entry in the first ACL specifies dimensional ranges that are contained by one or more sub-entries in the second ACL, and (ii) if the sub-entry in the first ACL and the one or more sub-entries in the second ACL specify the same policy action.

If the determination of step 130 is that equivalence exists, then the first ACL is determined in step 140 to be equivalent to the second ACL. If the determination of step 130 is negative, then the first and second ACL are determined in step 150 to not be equivalent.

In an embodiment, the sub-entries of the second ACL do not need to be compared to sub-entries of the first ACL in order to determine equivalence. It is assumed that all possible dimensional ranges that can be governed by a management policy using the first and second ACL are explicitly covered by the entries of each ACL. Therefore, once sub-entries of the first ACL are compared to sub-entries of the second ACL for equivalence, the reverse determination does not need to be made.

While an embodiment such as described provides for sub-entries of the first ACL to be compared to sub-entries of the second ACL, other embodiments may provide for only sub-entries of one ACL to be compared to entries of another ACL. For example, only the sub-entries of the first ACL may be necessary to determine equivalence between the first ACL and the second ACL.

2.2 Methodology for Identifying Sub-Entries from an ACL

FIG. 2 illustrates a method for determining sub-entries from entries in an ACL. In step 210, the dimensional range of an entry is determined. The dimensional range may be one or more of the following characteristics of a flow of communication packets: source port range, destination port range, source address range, destination address range, and protocol. Thus, step 210 involves determining what dimensions are represented in an entry, and the range of values represented in the entry.

In step 220, a determination is made as to whether the dimensional range of the entry overlaps dimensional ranges of other entries or identified sub-entries in the same ACL. If the determination in step 220 is negative, then step 230 provides that the sub-entry is the same as the entry. The method proceeds to step 290, where a determination is made as to whether another entry exists.

If the determination in step 220 is positive, then step 240 provides that the entry is compared to the overlapping entries or sub-entries in order to determine overlapping and non-overlapping sections in the dimensional ranges of that entry and the entries or sub-entries of the other ACL. In step 250, the dimensional ranges of the overlapping and non-overlapping sections are determined.

In step 260, a determination is made as to whether the entries that contain the overlapping dimensional ranges all specify the same policy action for that overlapping section. For example, a determination is made as to whether the entry identified in step 210 and the entries or sub-entries providing the overlapping sections of the dimensional ranges all specify "permit" as policy actions.

If the determination in step 260 is positive, then step 270 provides that sub-entries are identified for dimensional ranges corresponding to each of the non-overlapping and overlapping sections. Each sub-entry has a policy action. If there is no conflict amongst entries forming the overlap section, then the policy action is as stated with those entries. If a conflict exists, so that the determination in step 260 is negative, then step 280 provides that a conflict rule is used to assign a policy action to the overlap section(s) identified in step 240.

Following step 280, a determination is made in step 290 as to whether another entry exists in the ACL for identifying one or more sub-entries. If the determination is positive, then step 295 provides that the next entry is identified. The method returns to step 210. Else, the determination is made that all entries for the ACL are identified, and the method is done.

Figure 3:
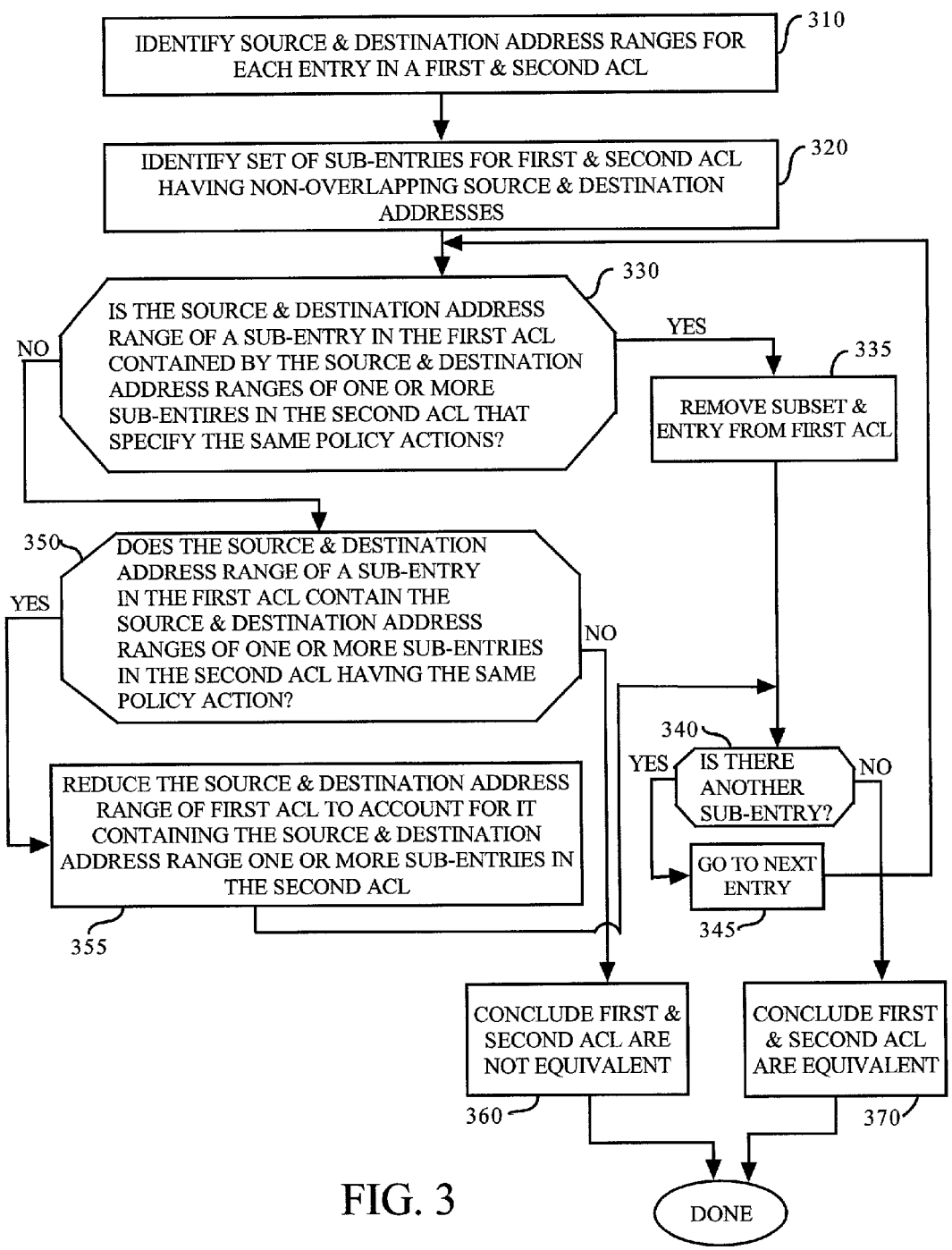
FIG. 3 is a flow diagram showing a more detailed method for determining whether two or more access control lists are equivalent using dimensional ranges corresponding to source and destination address ranges.

2.3 Methodology for Determining Whether Two ACLs are Equivalent Using Sub-Entries FIG. 3 is a flow diagram showing a more detailed method for determining whether two or more ACLs are equivalent using dimensional ranges corresponding to source and destination addresses.

In step 310, the source and destination ranges for each entry in a first ACL and in a second ACL are identified. Each entry also specifies a policy action for a particular source and destination range. Each entry may also specify dimensional ranges other than the source and destination addresses, including a source port range, a destination port range, and a protocol. Variations among the source and destination address ranges of entries in an ACL are more common, so source and destination addresses are described in greater detail with FIG. 3. Furthermore, as assumption is made that all entries of both the first and second ACL share the same dimensional range. Therefore, FIG. 3 is described with reference to only the source and destination address ranges, and not with reference to any other dimensional ranges.

Step 320 provides that a set of sub-entries are identified for the first ACL and for the second ACL. Each set of sub-entries is determined from the entries in that ACL. The source and destination addresses for the set of sub-entries in each ACL are non-overlapping. The source and destination address ranges for the sub-entries may also be contiguous over a particular range.

In step 330, a determination is made as to whether the source and destination address ranges of each sub-entry in the first ACL is contained by or equivalent to the source and destination ranges of one or more sub-entries in the second ACL, where the one or more sub-entries of the second ACL specify the same policy action as the sub-entry of the first ACL being considered.

If the determination in step 330 is positive, then in step 335 the sub-entry of the first ACL is removed from the determination of whether the first and second ACLs are equivalent. This accounts for the sub-entry of the first ACL having source and destination address ranges that are contained by entries in the second ACL.

Following step 335, at step 340 a determination is made as to whether there are any other sub-entries in the first ACL. If the determination is positive, then at step 345 the next sub-entry in the first ACL is considered by transferring control to step 330.

If the determination in step 330 is negative, then in step 350 a determination is made as to whether the source and destination addresses for the sub-entry in the first ACL contain source and destination address ranges of one or more sub-entries in the second ACL. The sub-entry in the first ACL is checked against one or more sub-entries in the second ACL having the same policy action.

If the determination to step 350 is positive, then in step 355, the source and destination address ranges of the sub-entry in the first ACL are reduced by the source and destination ranges of the one or more sub-entries in the second ACL. This accounts for the sub-entry of the first ACL having source and destination address ranges that contain one or more sub-entries in the second ACL. Following step 355, the method proceeds to step 340. If the determination in step 350 is negative, then step 360 concludes that the first and second ACLs are not equivalent. The method is then completed.

If the determination in step 340 is negative, so that there are no more sub-entries in the first ACLs, then step 370 concludes that the first and second ACL are equivalent.

3.0 Example of Determining if Two ACLs are Equivalent

A simple example for determining whether two ACLs are equivalent is provided below. Assume that a first ACL contains the following entries:

First Access Control List

| Action | Protocol | Source Address Range | Destination Address Range | Box |
|---|---|---|---|---|
| permit | FTP | host 171.68.129.129 | host 129.31.163.110 | 1 |
| deny | IP | 171.68.129.32 255.255.255.224 | 129.31.163.32 255.255.255.224 | 2 |
| permit | IP | 171.68.129.32 255.255.255.224 | 129.31.163.0 255.255.255.0 | 3 |
| deny | IP | 171.68.129.0 255.255.255.0 | 129.31.163.32 255.255.255.224 | 4 |
| permit | IP | 171.68.129.0 255.255.255.0 | 129.31.163.0 255.255.255.0 | 5 |

Assume that a second ACL contains the following entries:

Second Access Control List

| Action | Protocol | Source Address Range | Destination Address Range | Box |
|---|---|---|---|---|
| deny | IP | 171.68.129.0 255.255.255.0 | 129.31.163.32 255.255.255.224 | 1 |
| permit | IP | 171.68.129.0 255.255.255.0 | 129.31.163.0 255.255.255.0 | 2 |

The "Action" column of the ACLs represents policy actions that may be taken by a firewall where the ACL resides. The Protocol, Source Address Range and Destination Address Range columns represent three dimensions for the entries in each ACL. For simplicity, dimensional ranges provided by the Source Port and the Destination Port are assumed to be the same for each entry in both ACLs. For example, the Source and Destination Port ranges may be port 80, for web-based communications.

The Protocol column specifies a type of network communication protocol. The protocol is one of the dimensions for an entry. Specific examples of network communication protocol include Internet protocol (IP), File Transfer Protocol (FTP), User Datagram Protocol (UDP), and Transmission Control Protocol/Internet Protocol (TCP/IP).

A method such as described with FIG. 3 may be applied to determine whether the first ACL is equivalent to the second ACL. The entries in the first ACL may be represented graphically as boxes in two or more dimensions. Since entries in the first ACL are assumed to have the same source and destination port ranges, the box representation may be based on the source and destination address ranges.

Figure 4A:
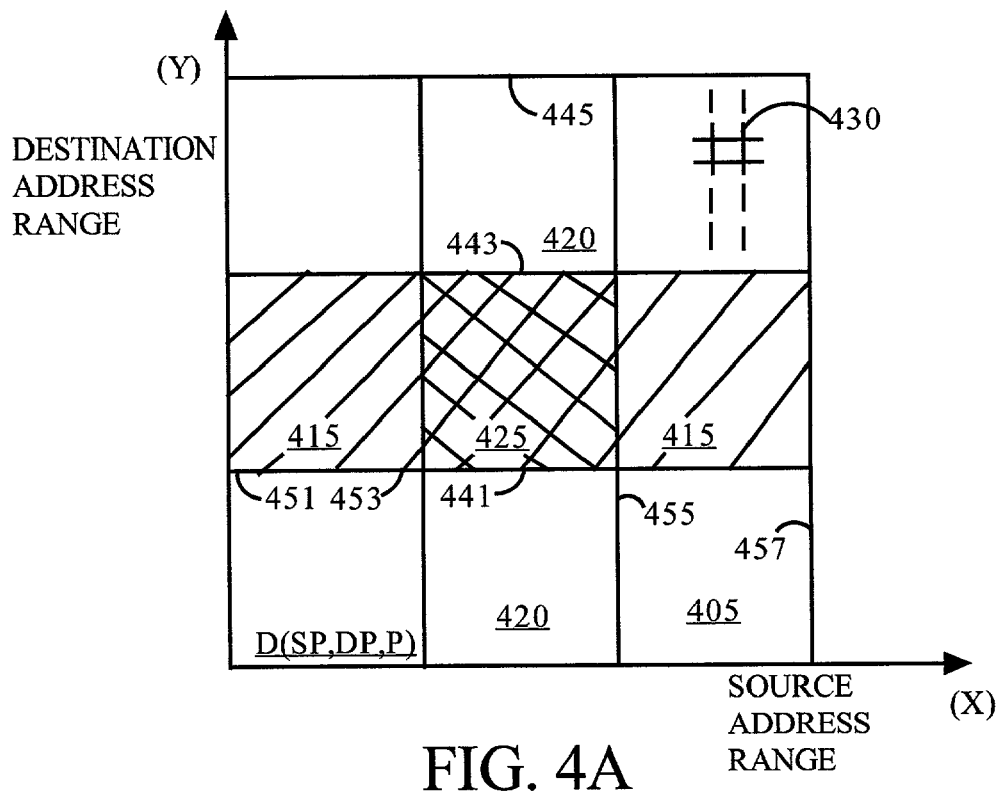
FIG. 4A is a block diagram showing a box representation for a source and destination address range for entries in a first ACL.

FIG. 4A is a block diagram showing a box representation for the source and destination address ranges for entries in the first ACL. The box representation is formed by mapping the source address range of each entry along an X-axis, and the destination address range of each entry along a Y-axis. Both the source and destination address ranges of an entry are determined using the trailing zeros on the end of the respective source and destination mask. The result is that each entry is represented as a box having source and destination address ranges as dimensions. Other dimensions may be substituted for either address range if necessary.

The source and destination address ranges of the other entries conform to the box representations. Box 5 is formed from the source and destination addresses of the last entry. Element 405 corresponds to Box 5.

Box 4 is the fourth entry. Element 415 represents Box 4. The mask of the source network has "0" as its trailer, meaning the source address ranges over 256 addresses. The destination mask has "224" as its trailer, meaning the destination address ranges over 32 possible addresses. Since the range of source addresses is larger than the range of destination addresses, Box 4 appears on the graph as a rectangle, having its length extending horizontally.

Element 420 corresponds to Box 3, and represents the source and address range for the next third entry. Box 3 is a rectangle extending its length in the Y-axis to correspond to its larger range of destination addresses.

Element 425 corresponds to Box. 2. Box 2 has a source range defined by the mask of the source network, and destination range defined by the mask of the destination network. Both of the masks have a range equaling about 32 addresses, based on the mask containing "224". Therefore, Box 2 is drawn to be square since its source and domain ranges, as defined by the masks of the source and destination networks, are the same size.

Box 1 provides the source and domain ranges of the last entry, and corresponds to element 430. The source and destination address ranges of the first entry is singular, meaning it specifies a policy action from one source to one destination. Singular address are represented as a box covering one point on the graph.

As illustrated by FIG. 4A, the first ACL has multiple entries that specify different policy actions for the same dimensional range. Such entries are referred to as "overlapping entries". For example, all the entries represented by Box 1, 2 3, and 4 overlap with Box 5. Box 2, 3 and 4 overlap with one another. A conflict rule that may be employed for determining the policy action of a dimensional range falling under two entries is that the earlier entry is to preempt a later entry.

In addition, one of the entries, typically the last entry, may be designated as the catch-all entry. The catch-all entry designates a policy action for all dimensional ranges. Other entries may change the policy action for portions or all of the dimensional ranges specified by the catch-all entry. However, the catch-all entry will specify the policy action for communications over dimensional ranges that are not specified by other entries in the ACL. In the example shown, element 405 is the catchall for the first ACL. Element 405 designates all addresses provided in the mask of the source network and destination networks.

Boxes 1, 3 and 5, represented by elements 430, 420 and 405 respectively, are permit actions. Boxes 2 and 4, represented by elements 425 and 415 respectively, are deny actions. Box 2 and 4 are shaded to represent the deny actions.

Sub-entries for the first ACL may be determined using a methodology such as described with FIG. 2. Each of the sub-entries are specified for dimensional ranges that not overlap. The box representations of the source and destination address ranges provides a representation to determine where dimensional ranges specified by entries overlap.

If two boxes overlap in source and destination ranges, the two boxes may be "subtracted" from one another to identify the overlapping and non-overlapping sections of the two boxes. The process of subtracting two boxes is not a mathematical operation, but a determination of where the two boxes overlap. If two boxes do not have overlapping source and destination addresses, so that they are disjoint, then those two boxes may be "added" together. The process of adding two boxes together is not a mathematical operation either, rather adding process refers to the union of the two boxes.

Under a methodology such as described with FIG. 2, sub-entries may be determined from an ACL by repeating the subtraction operation that subtracts boxes representing dimensional ranges of an entry by boxes representing dimensional ranges of previous entries. With regard to FIG. 4A, a list of sub-entries (provided on the left-hand side) may be determined for the first ACL as follows:

| | |
|---|---|
| B1* = Box 1, | A1* = B1* |
| B2* = Box 2 − A1*, | A2* = B1* + B2* |
| B3* = Box 3 − A2*, | A3* = B1* + B2* + B3* |

B3* (B2*, B1*, respectively) is a set of zero or more sub-entries, representing the non-overlapping dimensional ranges that are covered by Box 3 (Box 2, Box 1, respectively) but not covered by previous entries. By design, none of the sub-entries overlap one another. Each set of sub-entries is derived from subtracting one entry by all previous entries (or sub-entries) in the same ACL. A3*(A2*, A1*, respectively) is a set of one or more sub-entries, representing all non-overlapping dimensional ranges that are covered by Box 3 (Box 2, Box 1, respectively) and its previous entries. The addition of two sets of sub-entries is the union of the two sets. A general formula for determining all sub-entries based on a list of entries in the first ACL is:

$$An^* = B1^* + B2^* + \ldots B(n-1)^* + Bn^*$$

where:

$An^*$ is all sub-entries for the first ACL, $Bn^* = \text{Box } n - A(n-1)^*$, and Box n is the last entry in the first ACL.

The result of the subtraction of two boxes (Box 2-Box 1) is the section of Box 2 that is not covered by Box 1. It has three possibilities. If there is no overlap, then the result is the same of Box 2. If there is exact overlap, then the result of subtracting the two boxes from one another is none. If there is partial overlap, and the overlap is not identical in one or more of the dimensions, then the subtraction occurs in the dimensions that are different.

Given a Box A and a Box B that are identical in all dimensions but one dimension D (i.e. the source address range). The result of Box A-Box B may be accomplished as follows:

(1) for every dimension other than D, the low and high endpoint values are set to be identical to that of Box A;

(2) for the dimension D, if the low endpoint of Box A is smaller than the low endpoint of Box B, then a BoxA1* is created having (i) a low endpoint on dimension D that is equal to the low endpoint of Box A, and (ii) a high endpoint on dimension D that is equal to the low endpoint of Box B; and (3) for the dimension D, if the high endpoint of Box A is greater than the high endpoint of Box B, then a BoxA2* is created having (i) a low endpoint on dimension D that is equal to the f the high endpoint of Box B, and (ii) the high endpoint on dimension D that is equal to the high endpoint of Box A.

The methodology for subtracting boxes may be applied to the first ACL in order to determine all sub-entries in that ACL. Assuming only address ranges may differ, the box representation described above may be used to determine that Box 3 overlaps with Box 2, Box 4 overlaps with Box 2 and Box 3, and Box 5 overlaps with all boxes. Box 2, Box 3, Box 4 do not overlap with Box 1. Accordingly, the following subtractions may be performed:

$$B3^* = \text{Box} 3 - \text{Box } 2 \; (A3^* = B3^* + \text{Box} 2 + \text{Box} 1)$$

$$B4^* = \text{Box} 4 - A3^* \; (A4^* = B4^* + B3^* + \text{Box} 2 + \text{Box} 1)$$

$$B5^* = \text{Box } 5 - A4^* \; (A5^* = B5^* + B4^* + B3^* + \text{Box} 2 + \text{Box } 1)$$

B3* corresponds to a set of sub-entries, each of which correspond to a section of Box 3 that is not covered by Box 2. The sub-entries identified by B3* may be represented as boxes. None of the sub-entries overlap other sub-entries. Box 3 and Box 2 are identical in all dimensions except for the destination address range. For all dimensions, including the source address range, the low and high endpoints of the boxes representing the sub-entries are set to be equal to Box 3 or Box 2.

For the destination address range, the low endpoint of Box 3 is smaller than the low endpoint of Box 2, then a Box31* has a destination address range having a low endpoint that is equal to the low endpoint of Box 3, and a high endpoint equal to the low end of Box 2. Similarly, a Box32* is created has a destination address range having a low endpoint that is equal to the high endpoint of Box 2, and a high endpoint that is equal the high endpoint of Box 3. Box31\* and Box32\* represent non-overlapping sections of Box 3 subtracted from Box 2. Box31\*, Box32\* and Box 2 together form a set of non-overlapping representation of the dimensional ranges covered by Box3 and Box2.

With reference to FIG. 4A, Box31\* is defined by the lines 439, 441, 453, 455; Box32\* is defined by the lines 443, 445, 453, 455; and Box 2 is defined by the lines 441, 443, 453, 455.

A similar analysis is performed for determining sub-entries in B4\*. Each of the sub-entries in B4\* may be represented by boxes. The boxes represent non-overlapping sections of Box 4 subtracted from each of the boxes corresponding to the sub-entries of A3\*, which is the union of B3\*, Box2, and Box1. But only one of the sub-entry boxes in A3\*, Box 2, overlaps with Box 4. Therefore, other sub-entry boxes in A3\* can be ignored when subtracting Box 4 from the boxes in A3\*.

Using rules for subtracting boxes, two boxes result in subtracting Box 4 from Box 2. A first box, labeled Box41\*, has a low endpoint equal to the low endpoint of Box 4. The high endpoint of BoxB41\* is equal to the low endpoint of Box 2. A second box, labeled Box42\*, has a low endpoint equal to the high endpoint of Box 2, and a high endpoint equal to the high endpoint of Box 4.

With reference to FIG. 4A, Box41\* is defined by the lines 451, 453, 441, 443; and Box42\* is defined by the lines 455, 457, 441, 443.

Similar methodology may be used to identify sub-entries from Box 5. Box 1 and Box 5 intersect because Box 1 is a singular element contained in Box 5. Subtracting Box 1 from Box 5 yields 8 boxes. The intersection of Box 5 and the boxes representing sub-entries from the set of B4\*+B3\*+Box2 yields 8 more boxes. For brevity, details from subtracting intersecting boxes with Box 5 is left out, as such details are not necessary to understand embodiments of the invention.

In actuality, the number of boxes in any computation may be reduced using some simple reduction rules. For example, one reduction rule may provide that if one box completely contains another box, and both boxes specify the same policy action, then the smaller box may be ignored. Thus, Box 1 may be ignored by Box 5.

All of the sub-entries of the first ACL may be represented by the boxes yielded from the subtractions. These boxes include Box 1, Box 2, Box31\*, Box32\*, Box41\*, Box42\*, and other boxes located by the intersection of Box 5 with Box 1, and by the intersection of Box 5 with B4\*+B3\*+Box2.

Figure 4B:
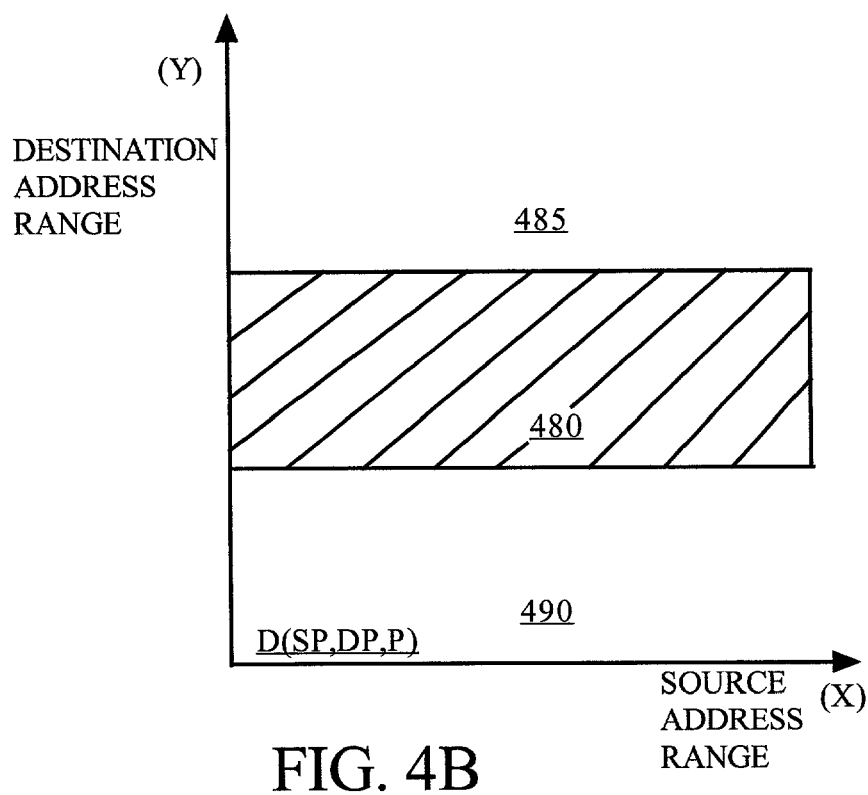
FIG. 4B is a block diagram showing a box representation for a source and destination address range for entries in a second ACL.

FIG. 4B is a box representation of sub-entries in the second ACL. The first entry of the second ACL is represented by element 480, which corresponds to Box 1. Elements 485 and 490, which surround Box 1, correspond to the second entry in the ACL specifying "permit". The "permit" entry of the second ACL provides a catch-all statement for the second ACL, in that it specifies "permit" for all dimensional ranges, except for dimensional ranges added by other entries.

The sub-entries of the first ACL may be compared to sub-entries of the second ACL in order to determine whether the first ACL is equivalent to the second ACL. The comparison is made by determining whether the dimensional range of every sub-entry in the first ACL is contained by dimensional ranges of one or more sub-entries in the second ACL that have the same policy action as the sub-entry in the first ACL. Therefore, in one embodiment, all of the "permit" entries in the first ACL are compared to all of the "permit" entries in the second ACL, and all of the "deny" entries in the first ACL are compared to all of the "deny" entries in the second ACL.

Accordingly, in making the determination as to whether the first ACL is equivalent to the second ACL, a first determination is whether the first, third and fifth entries of the first ACL are equivalent to the second entry in the second ACL. A second determination is whether the second and fourth entries of the first ACL are equivalent to the first entry of the second ACL. To make the first determination, all of the sub-entries for the first, third and fifth entries of the first ACL are determined to be equivalent to all of the sub-entries of the second entry in the second ACL. To make the second determination, all of the sub-entries for the second and fourth entries of the first ACL are determined to be equivalent to all of the sub-entries of the first entry in the second ACL.

The box representations facilitate making the determination of whether the sub-entries of the first ACL are equivalent to corresponding sub-entries of the second ACL. The "deny" entries of the first ACL have sub-entries represented by Box41\*, Box42\*, and Box2. Each of the boxes representing sub-entries for entries that specify "deny" are contained by the first entry in the second ACL. In other words, the dimensional ranges of the "deny" sub-entries of the first ACL are contained within dimensional ranges specified for "deny" sub-entries of the second ACL. Since sub-entries are derived from entries, equivalence of the "deny" sub-entries also means that the "deny" entries of the first ACL are equivalent to the "deny" entries of the second ACL.

A similar determination may be made for the "permit" entries of the first ACL and second ACL. Since there are considerable more number of sub-entries for "permit" entries, the actual determination will not be described in detail.

If every sub-entry in the first ACL is determined to have one or more sub-entries in the second ACL that form its equivalence, then the determination can be made that the first ACL is equivalent to the second ACL. This assumes that all dimensional ranges under consideration by the ACLs have specified a policy action, either explicitly or implicitly, by the combination of all entries in each ACL. For example, the fifth entry in the first ACL is a catch-all that explicitly specifies a policy action for all dimensional ranges not covered by the other entries in that ACL. If this assumption cannot be made, then the determination of whether the first ACL is equivalent to the second ACL requires the additional step of determining if each sub-entry in the second ACL has one or more corresponding sub-entries in the first ACL that is its equivalent.

Equivalence between dimensional ranges other than address and source destination ranges may also be identified in a manner described above. Equivalence between protocols may be identified using a set of rules that identify species of communication protocols as being within a genus, or amongst distinct species. For example, the first entry of the first ACL specifies "FTP", or File Transfer Protocol as its protocol. The other entries, including those of the second ACL, specify "IP", or Internet Protocol. FTP is a species of IP. Considering the overlap between Box 5 and Box 1, the effect of using FTP or IP is the same for the dimensional ranges defined by Box 1.

4.0 Implementation Architecture

Figure 5:
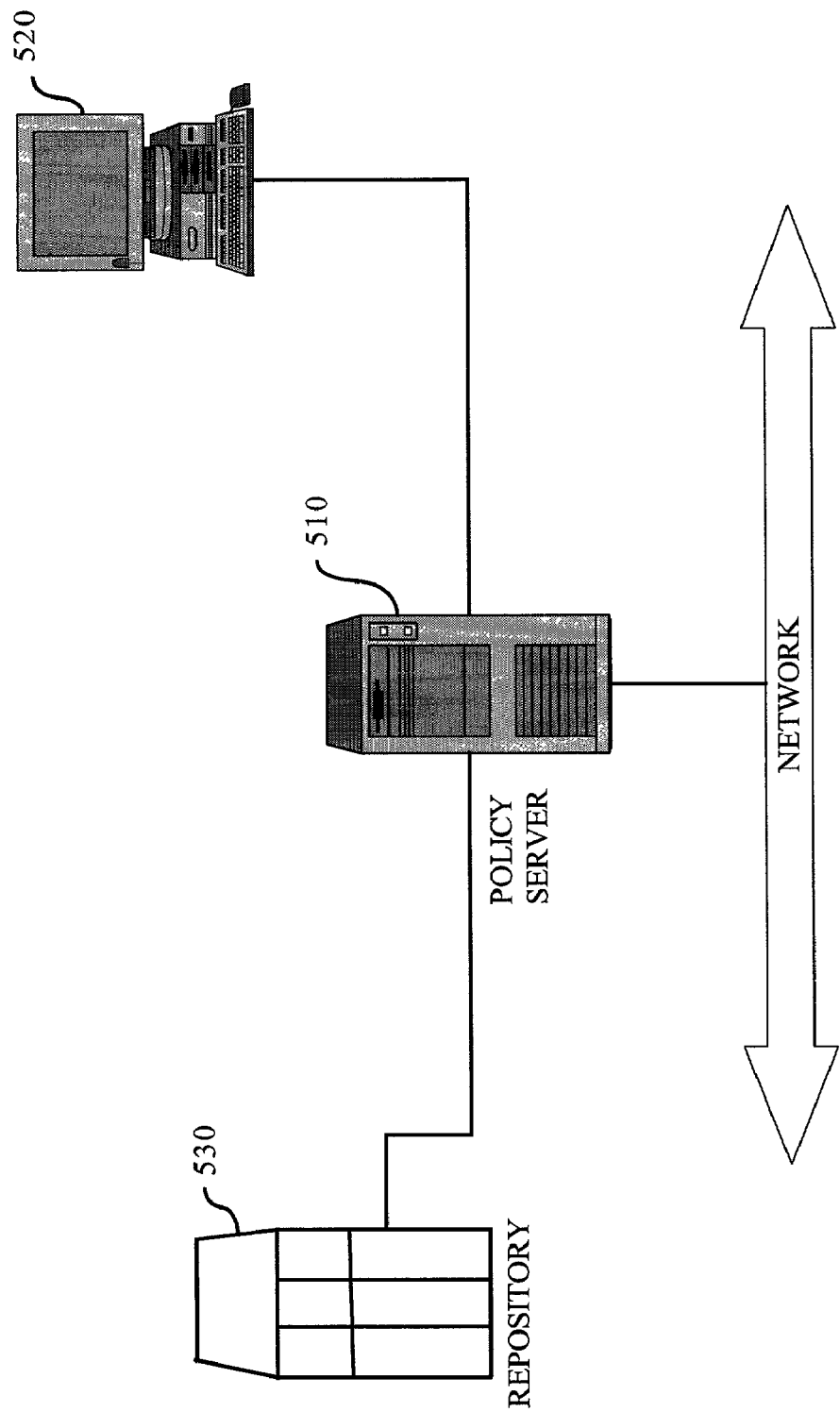
FIG. 5 is a block diagram showing components for managing security policies by determining whether access control lists are equivalent.

FIG. 5 illustrates components for managing security policies by determining whether two or more ACLs are equivalent. The system includes a policy server 510 and a repository 530. The system also includes a terminal 520 to operate policy server 510. The policy server 510 may access a network 500 in order to configure a plurality of firewalls or other security devices residing on network 500.

Policy server 510 and repository 530 may be components of an overall network management system. One commercially available network management system is CISCO SECURE POLICY MANAGER (CSPM), manufactured by CISCO SYSTEMS.

In an embodiment, policy server 510 executes instructions to determine whether two or more ACLs are equivalent. In one implementation, the policy server 510 executes instructions to determine whether the ACL of one firewall is equivalent to the ACL of another firewall.

In another implementation, a user may enter an optimal ACL into the policy server 510 via terminal 520. Other ACLs in use for configuring firewalls and other security devices on network 500 may be compared against the optimal ACL. If the ACLs are equivalent, then the optimal ACL is validated. Furthermore, configurations specified by ACLs that are equivalent to the optimal ACL may be deemed equivalent to the optimal configuration.

Still further, another implementation may enable an administrator to approve a configuration for the security devices, and to compare the existing configurations of the security devices on network 500 to the approved configuration. The configurations may be validated by comparing ACLs of the security devices being checked to the ACL of the approved configuration. If the ACLs are determined to be equivalent, then the existing configurations are validated.

5.0 Hardware Description

Figure 6:
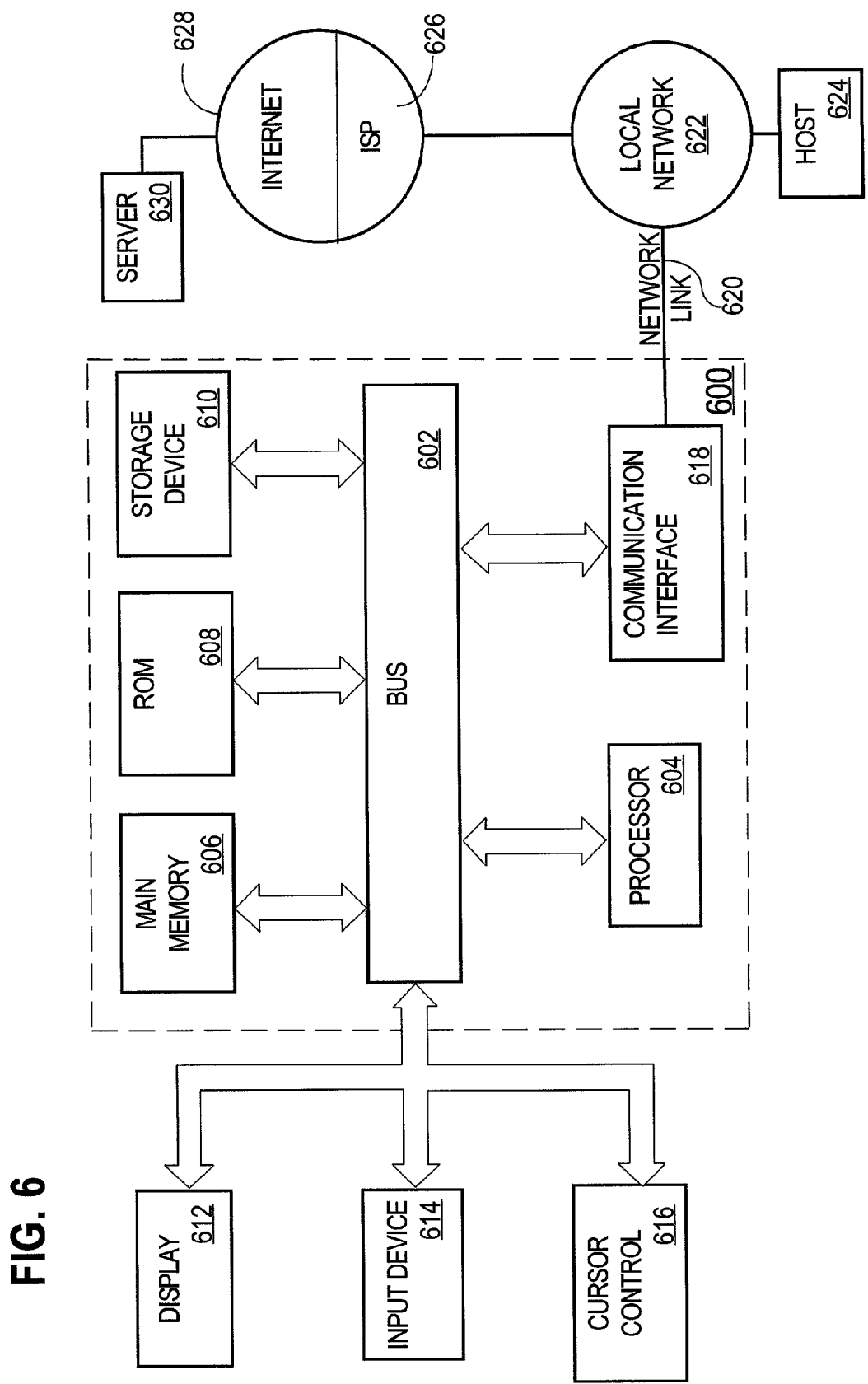
FIG. 6 is a block diagram that illustrates a computer system upon which an embodiment of the invention can be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory ("RAM") or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory ("ROM") 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube ("CRT"), for displaying information to a computer user. An input device 614, including alphanumeric and other keys, is coupled to bus 602 for communicating information and command selections to processor 604. Another type of user input device is cursor control 616, such as a mouse, trackball, stylus, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for comparing access control lists for implementing a security policy on a network. According to one embodiment of the invention, a method and apparatus for comparing access control lists for implementing a security policy on a network is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network ("ISDN") card or a modem to provide a data communication connection to a corresponding type of telephone line. As another example, communication interface 618 may be a local area network ("LAN") card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider ("ISP") 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for a method and apparatus for comparing access control lists for implementing a security policy on a network as described herein.

The received code may be executed by processor 604 as it is received, and/or stored in storage device 610, or other non-volatile storage for later execution. In this manner, computer system 600 may obtain application code in the form of a carrier wave.

6.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of comparing access control lists to configure a security policy on a network, the method comprising the computer-implemented steps of:
    subtracting a particular access control entry from another access control entry, wherein both the particular access control entry and said another control entry are two access control entries of multiple first access control entries and wherein the first access control entries, including the particular access control entry and said another access control entry, are all of access control entries as specified in a first access control list;
    identifying one or more first sub-entries in the first access control list, wherein the one or more first sub-entries include each of overlapping sections and non-overlapping sections of all of the first access control entries and wherein at least one of the one or more first sub-entries is derived from results of subtracting the particular access control entry from said another access control entry; and
    programmatically determining whether the first access control list is functionally equivalent to a second access control list by determining whether each of the first sub-entries in the first access control list is contained by one or more entries of multiple second access control entries in the second access control list;
    wherein the method is performed by one or more computing devices.

2. A method as recited in claim 1, wherein identifying one or more first sub-entries in the first access control list comprises:
    identifying a dimensional range and a policy action for each entry in the first access control list;
    identifying all overlapping dimensional ranges in the first access control list, each overlapping dimensional range corresponding to where the dimensional ranges of entries in the first access control list overlap;
    identifying all non-overlapping dimensional ranges in the first access control list, each of the non-overlapping dimensional ranges corresponding to dimensional ranges of entries in the first access control list that do not overlap dimensional ranges of other entries in the first access control list;
    identifying a policy action for each identified overlapping dimensional range in the first access control list; and
    identifying a policy action for each identified non-overlapping dimensional range of the first access control list.

3. A method as recited in claim 2, wherein identifying a dimensional range and a policy action for each entry in the first access control list includes identifying a source address range and a destination address range for communication packets specified by each of the entries in the first access control list.

4. A method as recited in claim 2, wherein identifying a dimensional range and a policy action for each entry in the first access control list includes identifying a source port range and a destination port range for communication packets specified by each of the entries in the first access control list.

5. A method as recited in claim 2, wherein identifying a dimensional range and a policy action for each entry in the first access control list includes identifying a communication protocol for communication packets specified by each of the entries in the first access control list.

6. A method as recited in claim 1, further comprising determining that the first access control list is functionally equivalent to the second access control list in response to a determination that each of the first sub-entries is contained by one or more entries of the second access control list.

7. A method as recited in claim 1, further comprising:
    identifying second sub-entries in the second access control list, wherein the second sub-entries identified from the second access control list comprise (i) disjoint entries of the second entries or (ii) overlapping sections identified from the second entries or (iii) non-overlapping sections identified from the second entries; and
    wherein determining whether each of the first sub-entry in the first access control list is contained by one or more entries of the second access control list includes determining whether the each of the first sub-entries in the first access control list is contained by one or more of the second sub-entries identified from the second control list.

8. A method as recited in claim 7, wherein identifying second sub-entries in the second access control list comprises:
    identifying a dimensional range and a policy action for each entry in the second access control list;
    identifying all overlapping dimensional ranges in the second access control list, each overlapping dimensional range corresponding to where the dimensional ranges of entries in the second access control list overlap;
    identifying all non-overlapping dimensional ranges in the second access control list, each of the non-overlapping dimensional ranges corresponding to dimensional ranges of entries in the second access control list that do not overlap dimensional ranges of other entries in the second access control list;
    identifying a policy action for each identified overlapping dimensional range of the second access control list; and
    identifying a policy action for each identified non-overlapping dimensional range of the second access control list.

9. A policy server communicatively coupled to security devices in a network to configure a security policy on a network, the policy server comprising:

a processor;

a network interface that communicatively couples the processor to the network to receive flows of packets therefrom;

a memory; and sequences of instructions in the memory which, when executed by the processor, cause the processor to carry out the steps of:

subtracting a particular access control entry from another access control entry, wherein both the particular access control entry and said another control entry are two access control entries of multiple first access control entries and wherein the first access control entries, including the particular access control entry and said another access control entry, are all of access control entries as specified in a first access control list;

identifying one or more first sub-entries in the first access control list, wherein the one or more first sub-entries include each of overlapping sections and non-overlapping sections of all of the first access control entries and wherein at least one of the one or more first sub-entries is derived from results of subtracting the particular access control entry from said another access control entry; and programmatically determining whether the first access control list is functionally equivalent to a second access control list by determining whether each of the first sub-entries in the first access control list is contained by one or more entries of multiple second access control entries in the second access control list.

10. A policy server as recited in claim 9, wherein said sequence of instructions further comprising instructions for performing determining that the first access control list is functionally equivalent to the second access control list in response to a determination that each of the first sub-entries is contained by one or more entries of the second access control list.

11. A policy server as recited in claim 9, wherein said sequence of instructions further comprising instructions for performing identifying second sub-entries in the second access control list, wherein the second sub-entries identified from the second access control list comprise (i) disjoint entries of the second entries or (ii) overlapping sections identified from the second entries or (iii) non-overlapping sections identified from the second entries; and wherein said instructions for performing determining whether each of the first sub-entry in the first access control list is contained by one or more entries of the second access control list include instructions for performing determining whether the each of the first sub-entries in the first access control list is contained by one or more of the second sub-entries identified from the second control list.

12. A policy server as recited in claim 11, wherein said instructions for performing identifying second sub-entries in the second access control list comprise:

instructions for performing identifying a dimensional range and a policy action for each entry in the second access control list;

instructions for performing identifying all overlapping dimensional ranges in the second access control list, each overlapping dimensional range corresponding to where the dimensional ranges of entries in the second access control list overlap;

instructions for performing identifying all non-overlapping dimensional ranges in the second access control list, each of the non-overlapping dimensional ranges corresponding to dimensional ranges of entries in the second access control list that do not overlap dimensional ranges of other entries in the second access control list;

instructions for performing identifying a policy action for each identified overlapping dimensional range of the second access control list; and instructions for performing identifying a policy action for each identified non-overlapping dimensional range of the second access control list.

13. A policy server as recited in claim 9, wherein said instructions for performing identifying one or more first sub-entries in the first access control list comprise:

instructions for performing identifying a dimensional range and a policy action for each entry in the second access control list;

instructions for performing identifying all overlapping dimensional ranges in the second access control list, each overlapping dimensional range corresponding to where the dimensional ranges of entries in the second access control list overlap;

instructions for performing identifying all non-overlapping dimensional ranges in the second access control list, each of the non-overlapping dimensional ranges corresponding to dimensional ranges of entries in the second access control list that do not overlap dimensional ranges of other entries in the second access control list;

instructions for performing identifying a policy action for each identified overlapping dimensional range in the second access control list; and instructions for performing identifying a policy action for each identified non-overlapping dimensional range of the second access control list.

14. A policy server as recited in claim 13, wherein said instructions for performing identifying a dimensional range and a policy action for each entry in the first access control list include instructions for performing identifying a source address range and a destination address range for communication packets specified by each of the entries in the first access control list.

15. A policy server as recited in claim 13, wherein said instructions for performing identifying a dimensional range and a policy action for each entry in the first access control list include instructions for performing identifying a source port range and a destination port range for communication packets specified by each of the entries in the first access control list.

16. A policy server as recited in claim 13, wherein said instructions for performing identifying a dimensional range and a policy action for each entry in the first access control list include instructions for performing identifying a communication protocol for communication packets specified by each of the entries in the first access control list.

* * * * *

UNITED STATES PATENT AND TRADEMARK OFFICE
CERTIFICATE OF CORRECTION

PATENT NO. : 7,636,937 B1  Page 1 of 1
APPLICATION NO. : 10/044019
DATED : December 22, 2009
INVENTOR(S) : Bhattacharya et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 981 days.

Signed and Sealed this

Twenty-first Day of December, 2010

David J. Kappos
*Director of the United States Patent and Trademark Office*